United States Patent [19]

Francis et al.

[11] Patent Number: 5,552,092

[45] Date of Patent: Sep. 3, 1996

[54] WAVEGUIDE COUPLER

[75] Inventors: Gaylord L. Francis, Painted Post, N.Y.; Ronald E. Johnson, Tioga, Pa.; Paul A. Tick, Corning; Lung-Ming Wu, Horsehads, both of N.Y.

[73] Assignee: Corning Incorporated, Corning, N.Y.

[21] Appl. No.: 408,791

[22] Filed: Mar. 23, 1995

Related U.S. Application Data

[62] Division of Ser. No. 251,326, May 31, 1994.

[51] Int. Cl.$^6$ .............................. G02B 6/16; G02B 6/42
[52] U.S. Cl. ............................ 264/1.24; 264/1.25
[58] Field of Search ................... 264/1.24, 1.25

[56] References Cited

U.S. PATENT DOCUMENTS

| | | | |
|---|---|---|---|
| 3,547,871 | 12/1970 | Hofmann | 260/37 |
| 3,568,012 | 3/1971 | Ernst et al. | 317/234 |
| 3,658,750 | 4/1972 | Tsukui et al. | 260/38 |
| 4,043,969 | 8/1977 | Sporck | 260/37 |
| 4,104,238 | 8/1978 | Chenoweth et al. | 260/37 |
| 4,358,552 | 9/1982 | Shinohara et al. | 523/443 |
| 4,987,274 | 1/1991 | Miller et al. | 174/102 |
| 5,009,692 | 4/1991 | Miller et al. | 65/3.11 |
| 5,089,445 | 2/1992 | Francis | 501/15 |
| 5,089,446 | 2/1992 | Cornelius et al. | 501/15 |
| 5,126,192 | 6/1992 | Chellis et al. | 428/323 |
| 5,158,990 | 10/1992 | Bayer et al. | 522/83 |
| 5,179,046 | 1/1993 | Francis | 501/15 |
| 5,185,835 | 2/1993 | Vial et al. | 385/49 |
| 5,243,680 | 9/1993 | Soane | 385/42 |

FOREIGN PATENT DOCUMENTS

| | | | |
|---|---|---|---|
| 553492A3 | 4/1993 | European Pat. Off. | 6/24 |
| 45911 | 2/1991 | Japan . | |

OTHER PUBLICATIONS

JP 03-045911 Abstract, No. 91-105062, Derwent, McLean VA (1991).
Charaterization of Nitrogen Containing Phosphate Glasses by X–Ray Photoelectron Spectroscopy, Marchand et al., Journal of Non–Crystalline Solids, 103 (1988) pp. 35–44.
Structure of Phosphorus Oxynitride Glasses, Bunker et al., J. Am. Ceram. Soc., 70[9] 675–81 (1987).
Preparation of Phosphous Oxynitride Glasses, Reidmeyer et al., Journal of Non–Crystalline Solids, 85(1986) pp. 186–203.
Properties and Structure of Nitrogen–Doped Phosphate Glasses, Changwen et al. Journal of Non–Crystalline Solids 112 (1989) pp. 296–301.
Oxygen Bonding in Nitrided Sodium and Lithium–Metaphosphate Glasses, Brow et al., Journal of Non–Crystalline Solids 99 (1988) pp. 178–189.

*Primary Examiner*—D. R. Wilson
*Attorney, Agent, or Firm*—William J. Chervenak

[57] ABSTRACT

The present invention relates to a method for packaging an optical waveguide coupler where the coupler includes a body having two end portions and a constricted portion located between the end portions. The method includes placing the coupler in a mold where the mold surrounds at least the constricted portion of the coupler, introducing a polymeric composition into the mold so that the polymeric composition substantially fills the constricted portion, curing the polymeric composition, and removing the mold.

6 Claims, 3 Drawing Sheets

WAVEGUIDE COUPLER

This is a division of application Ser. No. 08/251,326, filed May 31, 1994.

FIELD OF THE INVENTION

This invention relates to polymeric compositions and, in particular, to polymeric compositions that include a filler for controlling the composition's coefficient of thermal expansion (CTE). The invention also relates to the use of such compositions in the construction of optical waveguide couplers and other devices which include optical waveguide fibers.

BACKGROUND OF THE INVENTION

I. Fillers

Polymers commonly used in adhesives, coatings, sealants, and the like generally have high CTEs when compared to glasses, ceramics, metals, and metal oxides. This mismatch in expansion creates internal and interfacial stresses which often cause either delamination or poor product performance. The problem is the greatest at temperatures lower than the glass transition temperature ($T_g$) of the polymer where the polymer has its greatest modulus and thus cannot effectively release stresses through creep. As a result, at its in-use temperature, the polymer is typically in tension, while the lower CTE substrate is in compression.

A common approach to this problem is to add inorganic fillers having a lower CTE to the polymer. In some cases, special fillers with negative CTEs on the order of $-5 \times 10^{-7}/°C$. have been used, such as lithium aluminum silicates. Notwithstanding these efforts, polymeric compositions having CTEs close to zero or below zero (i.e., negative CTEs) have been difficult to achieve, even when large amounts of filler have been employed.

Examples of fillers which have been added to polymers of various types can be found in: C. F. Hofmann, U.S. Pat. No. 3,547,871, W. A. Ernst, et al., U.S. Pat. No. 3,568,012, M. Tsukui, et al., U.S. Pat. No. 3,658,750, C. R. Sporck, U.S. Pat. No. 4,043,969, Chenoweth et al., U.S. Pat. No. 4,104,238, Shinohara et al., U.S. Pat. No. 4,358,552, Miller et al., U.S. Pat. No. 4,987,274, Chellis et al., U.S. Pat. No. 5,126,192, and H. Bayer, et al., U.S. Pat. No. 5,158,990.

II. Crystallized Phosphate Glasses

Crystallized phosphate glasses which undergo a crystal (phase) inversion have been used to control the CTEs of lead and tin-phosphorous oxyfluoride sealing glasses. See Cornelius et al., U.S. Pat. No. 5,089,446 (tin-phosphorous oxyfluoride sealing glass), and Francis U.S. Pat. No. 5,089,445 (lead sealing glass).

In connection with these applications, the crystallized phosphate glass and the sealing glass, in particular, a tin-phosphorous oxyfluoride sealing glass, have been compounded with an organic medium to form a sealing composition, e.g., a sealing tape. See Francis et al., U.S. Pat. No. 5,179,046.

The organic medium included in these sealing compositions serves as a binder (carrier) for the sealing glass and the crystallized phosphate glass. The binder is specifically designed to vaporize as the sealing composition is used, i.e., the binder is chosen to have a high vapor pressure within the operating range of the sealing composition. In particular, the Francis et al. patent specifies that the binder should have a boiling point below 350° C.

In contrast, the polymers of the present invention constitute an essential part of the finished, in-use composition and thus do not substantially vaporize within the composition's operating range. That is, the organic medium of the Francis et al. patent was a fugitive medium, while the polymers of the present invention are non-fugitive. Moreover, in the Francis et al. patent, the crystallized phosphate glass does not serve to control the CTE of the binder, but rather is designed to control the CTE of the sealing glass after the binder has been vaporized. As discussed below, in accordance with the present invention, crystallized phosphate glasses are used to control (reduce) the CTEs of polymer compositions, an application very different from that of the foregoing Francis, Cornelius et al., and Francis et al. patents.

III. Optical Waveguide Couplers

The use of adhesives in the assembly of optical waveguide couplers is disclosed in, for example, Miller et al., U.S. Pat. No. 5,009,692. Adhesives have also been used in the formation of integrated optical components in which an optical waveguide formed in a substrate is coupled to one end of an optical waveguide fiber. See Vial et al., U.S. Pat. No. 5,185,835.

The use of filled adhesives having low CTEs in the construction of optical waveguide couplers is discussed in EPO Pat. Publication No. 553,492. This publication discloses a variety of fillers for use in such adhesives, including fillers composed of lithium aluminum silicates which have a negative CTE. The reference, however, does not disclose or suggest the use of crystallized phosphate glasses for this purpose.

SUMMARY OF THE INVENTION

In view of the foregoing, it is an object of the present invention to provide polymeric compositions having a novel filler material. It is a further object of the invention, to apply such polymeric compositions in the construction of optical waveguide couplers and other devices which include optical waveguide fibers.

To achieve these and other objects, the invention provides polymeric compositions which comprise an organic polymer or polymer blend and an inorganic filler which comprises particles of one or more crystallized phosphate glasses, each of the glasses being composed essentially of $P_2O_5$ and one or more cations selected from the group consisting of magnesium, cobalt, arsenic, zinc, iron, aluminum, and zirconium.

The polymer or polymers used in the composition do not substantially vaporize within the operating temperature range of the composition. The crystallized phosphate glass or glasses exhibit a crystal (phase) inversion within the operating temperature range of the composition. This crystal inversion (a morphology change) causes the filler particles to contract as the temperature rises through the crystal inversion temperature. This contraction, in turn, results in a reduced CTE for the composition, compared to that of the organic polymer(s) alone, as is desired.

Depending upon the specific ingredients and ingredient amounts used in formulating the polymeric composition (e.g., the polymer(s), their $T_g$'s and moduli, the amount of filler, the crystallized phosphate glass(es), their inversion temperatures, and the various optional ingredients discussed below), negative CTEs over at least a part of the operating range of the composition can be achieved, if desired.

For many applications, the polymeric composition needs to be water resistant. The crystallized phosphate glasses used in the practice of the invention have been found to be water sensitive in their natural state. In accordance with another aspect of the invention, it has been found that this water sensitivity can be removed by subjecting the glass particles to a nitriding process prior to their use as the filler. This process, which in a preferred form comprises exposing the particles to an atmosphere of cracked by-products of anhydrous ammonia for a period of, for example, from about 0.5 hours to about 4 hours, e.g., for about 1 hour, at a temperature of about 850° C., has been found to dramatically decrease the water sensitivity of the final polymeric composition. Nitriding the particles also improves their binding to the polymeric component of the composition.

A particularly important application of the polymeric compositions of the invention is in the construction of optical waveguide couplers and other devices which include optical waveguide fibers. Optical waveguide fibers are composed of glasses having very low CTEs. Mismatches between the CTEs of fibers and the CTEs of organic materials used in the construction of devices including fibers generally result in degraded optical performance.

Accordingly, as evidenced by EPO Pat. Publication No. 553,492, referred to above, there has been a continuing search for polymeric materials suitable for use with optical waveguide fibers. The polymeric compositions of the present invention, through the use of crystalline phosphate glasses which exhibit a crystal inversion, have been found to satisfy this need.

The accompanying drawings, which are incorporated in and constitute part of the specification, illustrate the various aspects of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

Figure 1:
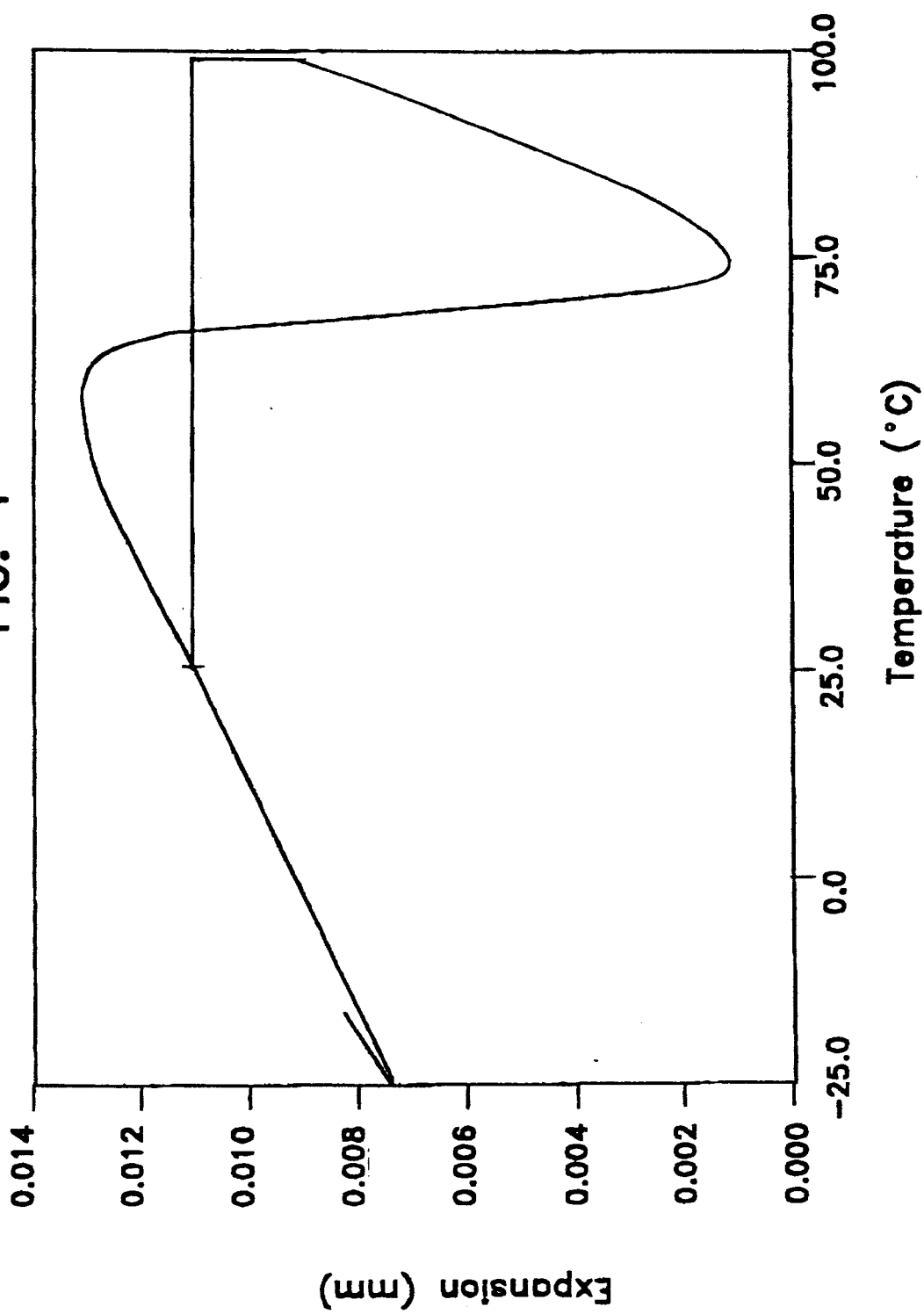
FIG. 1 is a plot of expansion versus temperature for the polymeric composition comprising a phenolic resin and a TI filler discussed in Example 3.

As discussed above, the present invention relates to polymeric compositions which include particles of a crystallized phosphate glass as a CTE controller.

The polymeric compositions can be used to produce a variety of articles of manufacture including molded articles, cast articles, sheet materials, sealants, adhesives, encapsulants, coatings, paints (i.e., coatings containing a pigment), and the like. Applications that will particularly benefit from the compositions of the invention, in addition to the optical waveguide couplers and other optical waveguide devices discussed above, include: low CTE adhesives for bonding to low CTE materials, where the low CTE of the adhesive will result in reduced stress at the interface between the adhesive and the material in the finished product; low CTE coatings for low CTE materials, where better adhesion and reduced warpage can be achieved through lower interfacial stress levels; low CTE encapsulants for electronics, where the low CTE of the encapsulant will result in reduced stresses being transferred to the encapsulated components; molding of precision components, e.g., dies, tight tolerance mating parts, etc., where dimensional accuracy is important; and polymer parts for inserting or mating with other parts made of low CTE materials, whereby the temperature range over which mating without mechanical interference or excessive gaps can be extended.

The polymeric component of the composition can be of the thermosetting or thermoplastic type. In general, the polymeric component, when below its $T_g$, should have a modulus of at least about $0.7 \times 10^9$ Pa, and preferably at least about $2 \times 10^9$ Pa. Examples of thermosetting materials which can be used in the practice of the invention include, without limitation, epoxy resins, epoxy-epoxy blends, epoxy-silicone blends, phenolics, melamines, acrylates, polyimides, rigid polyurethanes, and crosslinked polyesters. Examples of thermoplastic materials include, without limitation, polybutylene-terephthalates, polycarbonates, polystyrenes, polyphenylene oxides, polyphthalamides, polyolefins, polyesters, polyacrylates, nylons, acetals, liquid crystal polymers, cellulosics, vinyl chlorides, polyimides, polyphenylene sulfones, polyether ketones (PEK), and polyetherether ketones (PEEK). The polymeric component can also comprise a polymer blend, a glass-polymer blend, a metal-polymer blend, or a polymer alloy.

The polymeric component must not substantially vaporize within the operating temperature range of the composition. As used herein, the "operating temperature range" of the composition includes both the maximum temperature the composition reaches when being applied for its intended purpose (e.g., the maximum temperature achieved during casting, molding, or other form of application), the maximum temperature the composition reaches during curing in the case of thermoset resins, and the maximum and minimum temperatures which the composition can be expected to encounter during use after it has been applied.

Typically, the polymeric compositions of the invention are applied in a liquid form. For thermoplastic resins, this means that the application temperature will be above the glass transition temperature of the polymer or polymers making up the polymeric component and that the composition is cooled after it has been applied. For thermosetting resins, curing is performed after application to transform the composition into its final forming. The form of curing performed will depend upon the specific polymer or polymers employed and can include, for example, heat curing, UV curing, and the like. The in-use temperature of the composition will vary with the type of product which is being produced. For example, for products which must satisfy military specifications, the in-use temperature range will normally be between −65° C. and +125° C. For products involving optical waveguide fibers, the common industry temperature specification is from −40° C. to +85° C. The upper in-use temperature limit will typically be in the range from 100° C. to 300° C., with the upper limit being as high as 400° C. for a few, very thermally stable polymers. In particular, for many polymeric materials, in-use temperature ranges from about −65° C. to about 300° C. can be achieved, while for some aromatic polymers, the upper end of the range increases to about 350° C., and for PEKs, PEEKs, and some polyimides to about 400° C.

The novel filler of the invention (hereinafter referred to as the "TI filler", i.e., the "temperature inversion" filler) comprises particles of one or more crystallized phosphate glasses, each of the glasses being composed essentially of $P_2O_5$ and one or more cations selected from the group consisting of magnesium, cobalt, arsenic, zinc, iron, aluminum, and zirconium (hereinafter referred to as "TI particles"). These TI particles undergo a phase inversion which causes them to contract by about 0.2% as their temperature rises through the inversion temperature. In accordance with the invention, this shrinkage is used to compensate for the large positive expansion of the polymeric component of the overall composition.

The TI fillers of choice can be described by the formula $Mg_{2-x}A_xP_2O_7$, where x is between 0 and 2, and A can be Co to raise the inversion temperature or As, Zn, Fe, Al, or Zr to lower the inversion temperature. A range of inversion temperatures from below room temperature to as high as 300° C. can be obtained by such substitutions. Also, by using a mixture of particles of different compositions, inversions at various temperatures within the operating temperature range of the polymeric composition can be achieved. In this way, stress between the polymeric composition and a low CTE substrate can be manipulated to stay within a relatively narrow range during thermal cycling.

The TI particles can be prepared as described in the above-referenced Francis patent, i.e., U.S. Pat. No. 5,089,445, the relevant portions of which are incorporated herein by reference (see, in particular, column 5, lines 15–38). An alternate procedure for making $CoMgP_2O_7$ is set forth in Example 9 below.

To be effective in controlling the overall CTE of the composition, the TI particles should be at least about 5 microns in size (major dimension). Also, the inversion temperature of the particles should be less than glass transition temperature of the polymer or polymers making up the polymeric component. On the upper end, the TI particles will typically be smaller than about 100 microns, although larger particles can be used in such applications as, for example, polymer concretes.

As discussed above, for many applications, it is desirable to nitride the TI particles in order to make them water resistant. The nitriding can be accomplished by, for example, exposing the particles to an atmosphere of cracked by-products of anhydrous ammonia for about 1 hour at about 850° C. X-ray photoelectron spectroscopy (XPS) of $Mg_2P_2O_7$ particles treated in this way showed that the particles had incorporated 1.77 at % nitrogen in the surface region. Analysis of the spectrum showed various N species including P=N–P, and $_P^P$>P–N. Fourier transform IR (FTIR) spectra on the same sample did not show the presence of surface groups such as: $NH_3$ or $NH_4^+$.

In addition to the polymeric component and the TI filler, the polymeric compositions of the invention can include various optional ingredients including, without limitation, surfactants, curing agents, initiators, coupling agents, colorants, viscosity modifiers, phase separation tougheners, impact modifiers, stabilizers, UV blockers, and additional fillers which do not exhibit a temperature inversion, including, without limitation, talc (with or without a silane coating), $CaCO_3$, ZnO, mica, titania, alumina, antimony oxide, clays, and quartz (crystalline $SiO_2$).

An additional filler which has been found particularly useful in the formulation of the polymeric compositions of the invention comprises silica microspheres which are preferably silane treated. These microspheres can be made by a sol-gel process and are available commercially. Preferably, the microspheres are smaller than the TI particles, e.g., the microspheres are in the range of 1.5 microns. More generally, the microspheres should have a mean diameter which (i) is less than about 2 microns and (ii) is smaller than the mean diameter of the TI particles by a factor of at least 5. In this way, the microspheres serve as close packing agents and thus allow overall higher filler loadings to be achieved for the same viscosity of the composition. In addition, the small microspheres help to keep the larger TI particles suspended in the polymeric composition when that composition is in a fluid state, e.g., prior to curing of the composition.

The polymeric compositions of the invention are typically compounded by first mixing together the organic components, i.e., the polymeric component and any optional organic ingredients, and then adding the inorganic components, i.e., the TI filler or fillers and any optional inorganic ingredients. The compositions can be compounded using essentially any compounding technique used for filled thermoplastic or thermoset resins, provided the method does not result in excessive size reduction of the TI particles. Examples of suitable equipment for performing the compounding include sigma blade mixers, twin and single screw extruders, planetary mixers, 3-roll mills, and the like.

The organic components will typically comprise 20–80% by weight of the overall composition, and the TI filler or fillers on the order of 80–20 wt. %. When additional non-TI fillers are used, their concentration will typically be 10–40% of the weight of TI filler. When an epoxy resin is used, its concentration will typically be in the 20–40 wt. % range. When an impact modifier is used, its concentration will typically be in the 5–20 wt. % range. The remaining optional ingredients will typically comprise up to about 5 wt. % of the final composition.

As discussed above, one application of the polymeric compositions of the invention is in the assembly of couplers and other devices incorporating optical waveguide fibers. In particular, the polymeric compositions can be formulated as adhesives and used to affix optical waveguide fibers to a coupler tube, the general form of which is shown in the above-referenced Miller et al., U.S. Pat. No. 5,009,692, the relevant portions of which are incorporated herein by reference. Specifically, the polymeric compositions can be used as the glue shown at reference numbers 47, 49, 54, and 56 in FIGS. 3, 6, and 8 of the Miller et al. patent. The compositions can, of course, be used with coupler configurations other than those shown in the Miller et al. patent and with a variety of other devices employing optical waveguide fibers. See, for example, the integrated optical component of the above-referenced Vial et al., U.S. Pat. No. 5.185,835.

A further application of the invention is in the area of packaging of optical waveguide couplers. As discussed in EPO Pat. Publication No. 553,492, referred to above, in order to avoid damage and degraded performance, optical waveguide couplers need to be packaged in a stiffening material. The packaging approach disclosed in this patent publication involves wrapping the optical waveguide coupler with a low CTE composition which is composed of a polymeric resin, a filler which preferably has a negative CTE, and fibers which preferably run along the length of the coupler. This packaging approach produces an increase in the overall size (diameter) of the coupler and involves a series of application steps (forming the wrap, wrapping, curing, etc).

Figure 3:
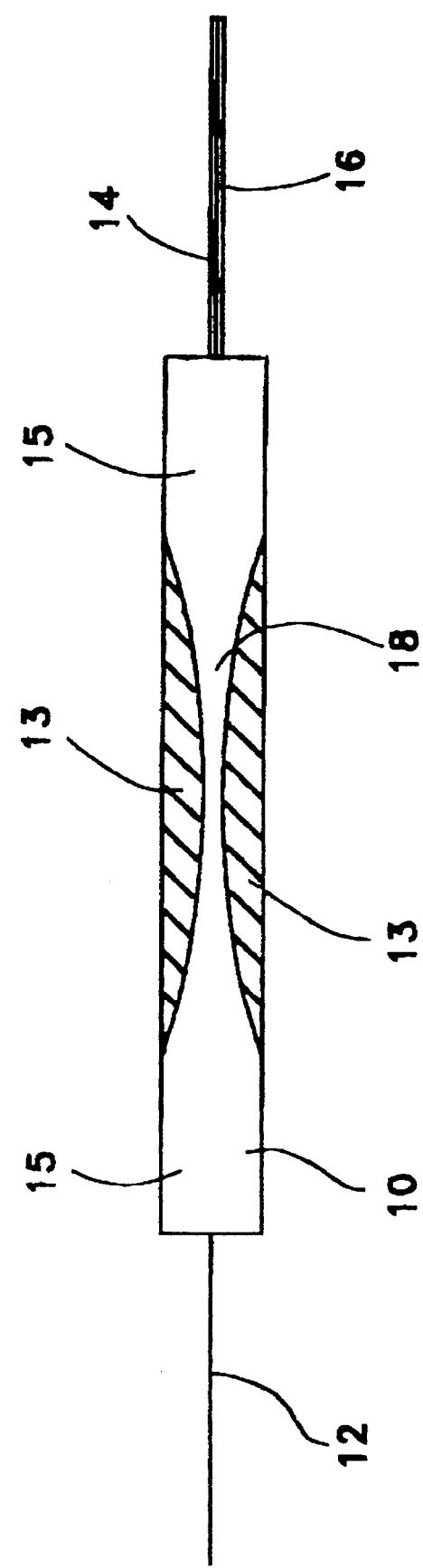
FIG. 3 is a schematic diagram illustrating use of the compositions of the invention in the packaging of an optical waveguide coupler.

In accordance with the present invention, it has been found that couplers can be successfully packaged with a simpler application procedure and without an increase in the coupler diameter. The approach is illustrated in FIG. 3 for a coupler 10 which, as illustrated, couples a single optical waveguide fiber 12 to two optical waveguide fibers 14 and 16. Coupler 10 has a substantially circular cross-section along its entire length.

In accordance with the invention, it has been found that suitable stabilization and protection for the coupler can be achieved by simply filling the constricted portion 18 of the coupler with polymeric composition 13. Polymeric composition 13 is preferably formulated in accordance with the principles discussed above, although other formulations can be used if desired. The composition preferably has a low CTE, e.g., a CTE between −40° C. and +85° C. of less than about $50 \times 10^{-7}/°$ C.

The polymeric composition can be applied to the coupler by means of a mold, e.g., a two piece mold, which engages end portions 15 of the body of the coupler. Once the mold is in place, the polymeric composition is introduced into the mold, e.g., is injected into the mold, and cured in place, e.g., by passing UV light through the walls of the mold, to form the finished packaged coupler. As shown in FIG. 3, the resulting product has a substantially uniform diameter along its length which is substantially equal to the diameter of end portions 15.

Without intending to limit it in any manner, the present invention will be more fully described by the following examples. The materials common to various of the examples are set forth in Table 1.

Example 1

This example illustrates use of the invention to control the stress between a coating and a low CTE substrate in an operating temperature range from the coating's cure temperature down to room temperature.

The polymeric composition was prepared by mixing the following ingredients to form a paste, where the ingredient amounts are in parts by weight (pbw):

| | |
|---|---|
| Dow Corning DEN 531 epoxy | 100 |
| Nadic methyl anhydride (hardener) | 90 |
| Tri(dimethylaminomethyl)phenol (catalyst) | 10 |
| $Mg_{1.6}Co_{0.4}P_2O_7$ particles | 39 |

The epoxy used in this composition had an elastic modulus of 300,000 psi ($2 \times 10^9$ Pa) at 25° C. and a $T_g$ of 160° C. The TI filler had a particle size that would pass through a 100 mesh screen, but not a 120 mesh screen. Its inversion temperature was 90° C., which was intermediate between the $T_g$ of the polymer and room temperature.

The paste was applied to a piece of fused silica and cured for 1.5 hrs at 200° C. Polarimeter examination of the composite showed the fused silica to be in tension, corresponding to a negative expansion of the composition as it cooled from 200° C. down to 25° C. Since the epoxy by itself would have contracted when cooled, this result shows that the TI filler was able to control (reduce) the CTE of the composition.

Example 2

This example illustrates use of the invention to control the stress between a coating and a low CTE substrate in an operating temperature range from room temperature to −50° C.

The polymeric composition was prepared by mixing the following ingredients to form a paste, where the ingredient amounts are in parts by weight (pbw):

| | |
|---|---|
| Borden ultraviolet curing silicone #278-284-2 | 100 |
| $Mg_{1.6}Zn_{0.4}P_2O_7$ | 150 |

The silicone resin had a $T_g$ of 40° C. and the TI filler had a particle size of less than 44 microns and an inversion temperature of 0° C., which was intermediate between the $T_g$ of the polymer and −50° C.

The paste was applied to fused silica and cured at room temperature with an ultraviolet light. Polarimeter examination of the composite showed the fused silica to be in tension at −50° C., corresponding to a negative expansion of the composition as it was cooled from 25° C. down to −50° C. Since the silicone resin by itself would have contracted when cooled, this result shows that the TI filler was able to control (reduce) the CTE of the composition.

Example 3

A polymeric composition suitable for making low expansion, low shrinkage precision polymer parts was prepared by dry mixing 35 parts by weight of Durez's 29320 phenolic with 65 parts by weight of a TI filler comprising $Mg_2P_2O_7$ particles in the size range from 5 to 44 microns. The mixture was hot pressed at the processing temperature of the polymer, and the expansion behavior of the resulting product was measured using a Perkin-Elmer 7 Series Thermal Analysis System.

The results are shown in FIG. 1. The dip which appears in this curve corresponds to the phase inversion of the TI filler. The CTE of the composition between 25° C. and 108° C., as determined using the horizontal and vertical lines of FIG. 1, was $-54.4 \times 10^{-7}/°$ C. As is evident from these results, the TI filler drastically reduced the overall expansion of the composition.

The same experiment was repeated with the following polymers: Amoco's Kadel E-1000 polyketone, Amoco's Xydar SRT-900 polyester, Phillips Ryton P-4 polyphenelene sulfide, G.E.'s BHPP801 polycarbonate, and G.E.'s BHPP821 polyphenelene oxide. In each case, the overall expansion of the composition was significantly reduced by the TI filler.

Example 4

An adhesive having a low CTE was prepared having the following composition, where the ingredient amounts are in parts by weight (pbw):

| | |
|---|---|
| UVR6105 epoxy resin | 1,000 |
| trimethylolpropane | 48 |
| Z6040 silane | 10 |
| UVI6974 photoinitiator | 25 |
| $Mg_2P_2O_7$ TI particles | 704 |

The unfilled epoxy used in this composition had a modulus of $8.4 \times 10^9$ Pa at 25° C. and a $T_g$ of approximately 170° C. The TI filler comprised particles in the size range from 5 to 37 microns and had an inversion temperature of 68° C. As a control, the same formulation was prepared using a low expansion silica powder instead of the TI filler.

Figure 2:
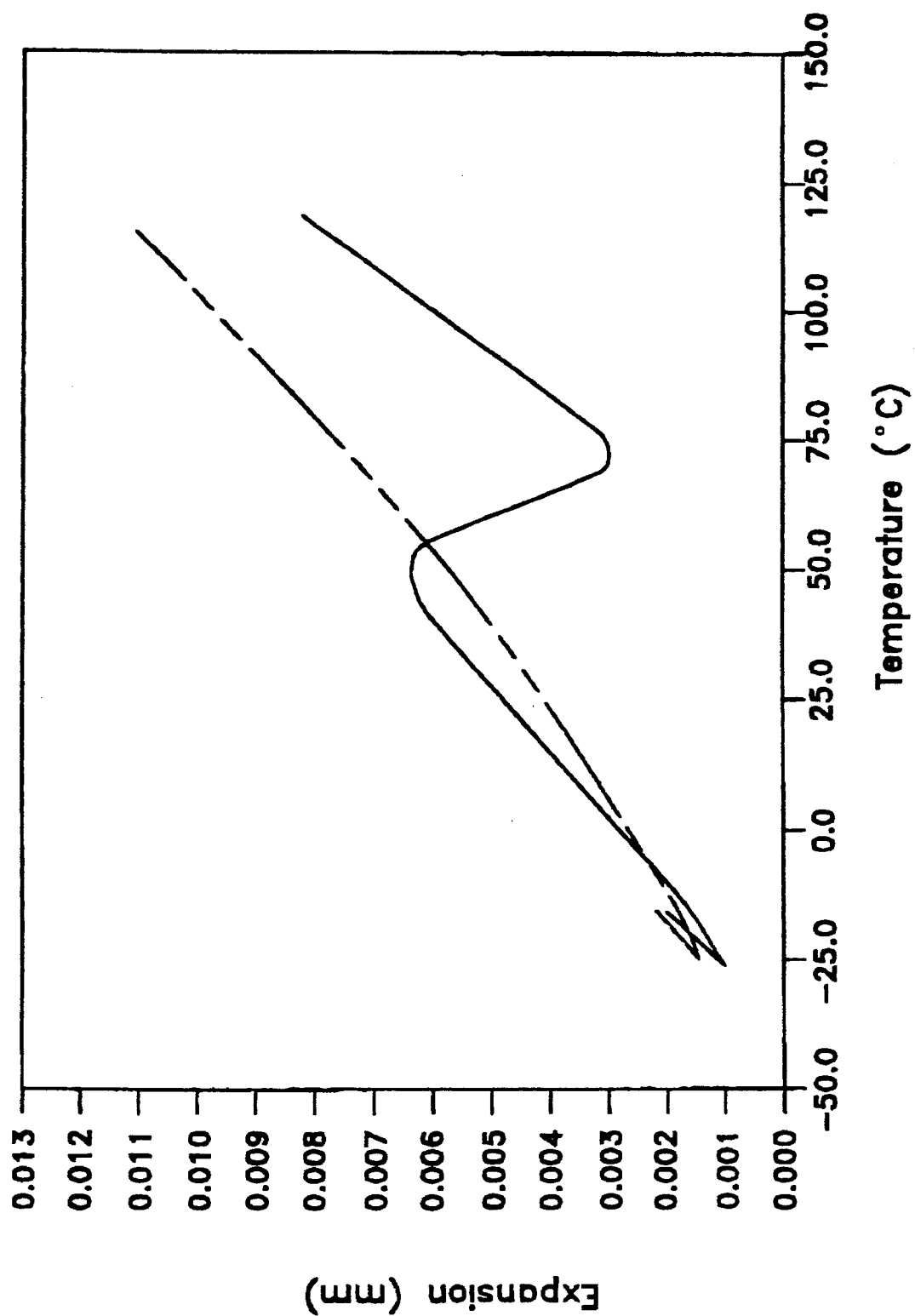
FIG. 2 is a plot of expansion versus temperature for the polymeric composition discussed in Example 4.

The expansion characteristics of the two formulations were measured using a Perkin-Elmer 7 Series Thermal Analysis System and the results are shown in FIG. 2, where the solid line is the expansion curve for the experimental formulation and the dashed line is the expansion curve for the control formulation. As can be seen in this figure, the total expansion from 25° C. to 125° C. is substantially reduced by using the $Mg_2P_2O_7$ filler in place of the low expansion fused silica filler.

Example 5

This example illustrates the water resistance achieved by nitriding TI particles. The nitriding was performed in a box furnace equipped with an Inconel retort using the procedure described above, i.e., by exposing the particles to an atmosphere of cracked by-products of anhydrous ammonia for about 1 hour at about 850° C. The ammonia atmosphere was provided by a tank of liquid ammonia. The TI particles were composed of $Mg_2P_2O_7$ and thus had an inversion temperature of 68° C.

Epoxy resin formulations were prepared containing both unmodified and ammonia-modified TI particles. The formulations were used to attach small diameter rods having the same cross sectional area to silica plates. The force necessary to detach the rod from the silica plate was used as a measure of the adhesion strength.

The detachment forces were measured on freshly prepared samples formulated with either unmodified or ammonia-treated TI particles. Other samples were exposed to 85% relative humidity (RH) at 85° C. for 65 hours, and then the detachment forces were measured. The results are shown in Table 2. As can be seen therein, there was a dramatic decrease in the detachment force after moisture exposure when the unmodified filler was used, while the ammonia-modified filler exhibited a significantly smaller decrease in the detachment force.

The magnitude of water "pick-up" was also measured using two different tests. First, the treated and untreated $Mg_2P_2O_7$ powders were placed in a humidity chamber at 85% RH and 85° C. for one week and the weight gains were measured. The untreated powder had a weight gain of 7%, while the ammonia-treated powder had a weight gain of less than 0.01%. That is, the ammonia treatment virtually completely eliminated water pick-up. Infra-red spectra of the treated and untreated powders also showed substantially less adsorbed water on the ammonia-treated $Mg_2P_2O_7$ particles after exposure to the high humidity atmosphere.

In the second test, samples of the filled epoxy formulations used in the detachment experiments were exposed to 100% RH for 24 hours at 42° C. It was found that the amount of water adsorbed with the ammonia-treated filler was no different from the amount of water absorbed by the epoxy resin itself without any filler, thus showing that the modified filler did not adsorb any significant amount of water.

Example 6

The effects of nitriding were further confirmed using the following three fillers:

(1) 4:1 $Mg_2P_2O_7$ (untreated):Geltech 2.2
(2) 4:1 $Mg_2P_2O_7$ (ammonia treated):Geltech 2.2
(3) 3:1 Aceto:Geltech 2.2

Each filler was incorporated in an epoxy resin having the following composition, where the ingredient amounts are in parts by weight (pbw):

| | |
|---|---|
| Cyracure UVI-6974 | 1.5 |
| Z6040 | 4 |
| UVR-6105 | 65 |
| Eponex 1510 | 25 |
| UVR 6200 | 10 |

In each case, the filler loading was 72% by weight.

The results of this experiment are shown in Table 3. As can be seen therein, the ammonia treatment reduced the level of water absorption to that seen with a filler composed of just silica microspheres.

Example 7

Table 4 sets forth a series of formulations which have been found suitable for use as adhesives in the preparation of optical waveguide couplers. Formulations A and B are essentially equivalent in performance and are preferred. The coupler stress data that appears in this table represents the retardation of light passing through the coupler in degrees of rotation of a polarizer as a result of stress between the adhesive and the optical waveguide fibers which are being coupled.

The magnesium pyrophosphate particles ($Mg_2P_2O_7$ particles) used in these formulations were nitrided as described above and were sized by screening through a 325 mesh screen (44 microns) to remove coarse material, followed by air classifying to remove fines and particles having a size above 35 microns. The resulting particles had a size distribution between about 8 and about 35 microns. Instead of air classifying, levitation techniques using a liquid can be used. For production purposes, air classifying is preferred.

The compositions were formulated as follows. First, the organic materials and the Geltech filler were milled together in a three roll mill until the particle size of the mixture was 10 microns or less as measured using a Hegman gauge. The TI filler was then added and the mixture milled again in the three roll mill, using a coarser setting, until the particle size, measured with the Hegman gauge, was 40 microns or less. Finally, the product was deaired using a vacuum-equipped Helicon mixer.

The formulation of Table 4 is specifically designed for use with couplers of the general type shown in U.S. Pat. No. 5,009,692, referred to above. The following formulation can be used as an adhesive for assembling intergrated optical components of the type shown in U.S. Pat. No. 5,185,835, also referred to above:

| | |
|---|---|
| LCR-00V epoxy resin | 100 pbw |
| Geltech 2.2 | 13.01 pbw |
| Microsphres- | |
| 1.5 microns; A187-0.5 | |
| Nitrided magnesium | 91.07 pbw |
| pyrophosphate particles | |

The LCR-00v eposy resin used in this formulation is available from Zeneca Resins, Wilimington, Mass. The nitrided magnesium pyrophosphate particles are the same as those used in the formulations of Table 4.

Example 8

Table 5 sets forth two formulations which have been found suitable for use in the packaging of optical waveguide couplers in accordance with FIG. 3 and the discussion of that figure which appears above. The ingredient amounts in Table 5 are in parts by weight.

Packaged couplers having the configuration of FIG. 3 were prepared using the formulations of Table 5 and the molding technique described above. The couplers were tested for their average maximum insertion loss (I.L.) delta dB between 0° C. and 65° C. at 1550 nm, both with and without a one week water immersion at 43° C. A packaged coupler prepared in accordance with EPO Pat. Publication No. 553,492 was tested for comparison.

The results are shown in Table 6. As shown therein, both formulations achieved low insertion losses, with the insertion loss for the F formulation being as low as that obtained with the packaging approach of EPO Pat. Publication No. 553,492. The insertion losses increased after the water treatment, but were still acceptable, especially in the case of the F formulation. Based on this data, the F formulation is considered preferred for this application.

Example 9

This example describes the production of a crystallized phosphate glass which contains magnesium and cobalt and is suitable for preparing a TI filler having an inversion temperature of 167° C.

63.72 grams of $(Co_3O_4NO_3)_2 6H_2O$ were dissolved in 100 ml of $H_2O$, and 6.95 grams of MgO were mixed into 43.9 gms of phosphoric acid. The dissolved cobalt was added to the phosphoric acid/MgO mixture, and within 48 hours, the a clear purple solution was produced.

This solution was heated slowly to 400° C. and a blue colored powder was observed that x-ray analysis showed to be almost non-crystalline. The material was then heated to 900° C. at a rate of 2° C. per minute, and the sample was observed to be not very sintered. X-ray analysis of the sample showed only a pyrophosphate phase.

The material was then heated to 1100° C. at the same rate and held there for 2 hours. At this point it was uniformly colored, crystalline, and well sintered. A differential scanning calorimeter analysis was run on the sample which showed a single inversion at 167° C.

Although preferred and other embodiments of the invention have been described herein, additional embodiments may be perceived by those skilled in the art without departing from the scope of the invention as defined by the following claims.

TABLE 1

| Materials | | |
|---|---|---|
| Material | Function | Source |
| A-187 | silanizing compound (gamma-glycidoxy-propyltrimethoxysilane) | Union Carbide Midland, MI |
| Cyracure UVI-6974 | photoinitiater | Eastech Chemical Philadelphia, PA |
| DEN 531 epoxy | epoxy resin | Dow Chemical Midland, MI |
| ELC-2500 organic base | epoxy resin/ photoinitiater blend | Electrolite Corp. Danbury, CT |
| Eponex 1510 | epoxy resin | Miller Stephenson Danbury, CT |
| ERL 4206 | cycloaliphatic diepoxide | Eastech Chemical Philadelphia, PA |
| –400 mesh Aceto microspheres A187-0.5 | non-TI filler; silanized with 0.5 wt. % A-187 silanizing compound | Aceto Corp. Lake Success, NY |
| Geltech 2.2 | non-TI filler; silanized | Geltech Corp. |

TABLE 1-continued

| Materials | | |
|---|---|---|
| Material | Function | Source |
| Microspheres-1.5 microns; A187-0.5 | with 0.5 wt. % A-187 silanizing compound | Alachus, FL |
| Niax LHT-240 | polyol (crosslinker) | Eastech Chemical Philadelphia, PA |
| Photonol Pho-7127 | polyol (crosslinker) | Henkel Corp. Ambler, PA |
| Photonol 7149 | polyol (crosslinker) | Henkel Corp Ambler, PA |
| Quatrex 1010 | bisphenol A epoxy resin | Dow Chemical Midland, MI |
| Trimethyol Propane | polyol (crosslinker) | Henkel Corp Ambler, PA |
| UVR-6974 | photoinitiater | Eastech Chemical Philadelphia, PA |
| UVR-6105 | epoxy resin | Eastech Chemical Philadelphia, PA |
| UVR-6200 | epoxy resin | Eastech Chemical Philadelphia, PA |
| Z6040 | silanizing compound | Dow Chemical Midland, MI |

TABLE 2

| Detachment Force of Silica/Epoxy Bond | |
|---|---|
| Sample | Detachment Force (lbs.) |
| Fresh sample modified and unmodified filler | 20 |
| With modified filler after water exposure | 15 |
| With unmodified filler after water exposure | 7 |

TABLE 3

| | Water Absorption | | |
|---|---|---|---|
| Filler ID | % Wt. Gain | % Extractables | % Absorption |
| 1 | 1.52 | 0.06 | 1.58 |
| 2 | 0.80 | 0.01 | 0.81 |
| 3 | 0.71 | 0.02 | 0.73 |

TABLE 4

| | Formulations | | | |
|---|---|---|---|---|
| Ingredients | A | B | C | D |
| ELC2500 organic base | — | 31.36 | — | — |
| UVR-6105 | 75 | — | 75 | 75 |
| Eponex 1510 | 25 | — | 25 | 25 |
| Photonol Pho-7127 | 7.3 | — | — | — |
| Niax LHT-240 | — | — | 16.2 | 10.8 |
| Cyracure UVI-6974 | 2.5 | 0.32 | 2.5 | 1.5 |
| Z6040 | 1 | — | 1 | — |
| Geltech 2.2 Microspheres-1.5 microns; A187-0.5 | 29.5 | 8.42 | 31.86 | 29.9 |
| Magnesium pyrophosphate particles | 206.49 | 58.91 | 223.03 | 209.90 |

TABLE 4-continued

| Ingredients | Formulations | | | |
|---|---|---|---|---|
| | A | B | C | D |
| (T1 filler) Coupler Stress | | | | |
| at 25° C. | 5 | 14 | 26 | 13 |
| at 125° C. | −20 | −10 | −20 | −30 |
| Tan delta Tg (°C.) | 159.1 | 170.3 | 135.5 | 164.6 |
| E' at 25° C. ($10^8$ Pa) | 106.0 | 106.0 | 89.7 | 95.1 |
| E' at 125° C. ($10^8$ Pa) | 52.2 | 54.6 | 15.8 | 43.4 |

TABLE 5

| Ingredients | Formulations | |
|---|---|---|
| | E | F |
| Cyracure UVI-6974 | 2.50 | 2.50 |
| Z6040 | 1.00 | 1.00 |
| Nitrided Magnesium Pyrophosphate $Mg_2P_2O_7$ | 71.21 | 71.02 |
| Nitrided Zinc Magnesium Pyrophosphate $Zn_{0.4}Mg_{1.6}P_2O_7$ | 142.31 | 141.93 |
| Geltech 2.2 Microspheres-1.5 microns; A187-0.5 | 35.55 | 35.45 |
| UVR-6105 | 50.00 | 30.00 |
| Quatrex 1010 | 30.00 | 50.00 |
| ERL 4206 | 20.00 | 20.00 |
| Trimethyol Propane | 2.60 | 2.50 |
| Photonol 7149 | 4.60 | 4.40 |

TABLE 6

| | Insertion Losses | |
|---|---|---|
| Formulations | 0° C. to 65° C. Avg. Max. I.L. delta Db at 1550 nm | One week water immersion at 43° C.; 0° C. to 65° C. Avg. Max I.L. delta Db at 1550 nm |
| E | 0.16 | 0.50 |
| F | 0.07 | 0.16 |
| EPO 553,492 | 0.07 | — |

What is claimed is:

1. A method for packaging an optical waveguide coupler, said coupler comprising a body having two end portions and a constricted portion located between the end portions, said method comprising:

(a) placing the coupler in a mold, said mold surrounding at least the constricted portion of the coupler;

(b) introducing a polymeric composition into the mold, said polymeric composition substantially filling the constricted portion;

(c) curing the polymeric composition; and (d) removing the mold wherein the end portions of the coupler each have a substantially circular cross-section of diameter D and the mold is configured so that the constricted portion when filled with the cured polymeric composition has a substantially circular cross-section whose diameter is substantially equal to D.

2. The method of claim 1 wherein the polymeric composition comprises:

(a) an organic polymer which comprises about 20 wt. %–80 wt. % of the polymeric composition; and (b) a first inorganic filler which comprises about 80 wt. %–20 wt. % of the polymeric composition and having a phase inversion temperature between −40° to 400° C., said first inorganic filler comprising particles of one or more crystallized phosphate glasses, each of the glasses comprising $P_2O_5$ and one or more cations selected from the group consisting of magnesium, cobalt, arsenic, zinc, iron, aluminum, and zirconium, wherein said organic polymer has a glass transition temperature higher than said phase inversion temperature of the first inorganic filler so that the first inorganic filler reduces the polymeric composition's coefficient of thermal expansion at temperatures of −40° to 400° C.

3. The method of claim 2 wherein the organic filler has been nitrided.

4. The method of claim 2 wherein the particles of said first inorganic filler have a size that is greater than about five microns.

5. The method of claim 2 wherein the particles are comprised essentially of $Mg_2P_2O_7$.

6. The method of claim 2 wherein the polymeric composition further comprises a second inorganic filler which comprises silane-treated silica microspheres whose size is smaller than the size of the particles of the first organic filler.

* * * * *